United States Patent
Sakawaki

(10) Patent No.: US 11,009,070 B2
(45) Date of Patent: May 18, 2021

(54) MAGNETIC BEARING DEVICE AND COMPRESSOR

(71) Applicant: DAIKIN INDUSTRIES, LTD., Osaka (JP)

(72) Inventor: Atsushi Sakawaki, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 420 days.

(21) Appl. No.: 16/003,961

(22) Filed: Jun. 8, 2018

(65) Prior Publication Data

US 2018/0291957 A1 Oct. 11, 2018

Related U.S. Application Data

(63) Continuation of application No. PCT/JP2015/006174, filed on Dec. 10, 2015.

(51) Int. Cl.
*F16C 32/04* (2006.01)
*H02K 7/09* (2006.01)
(Continued)

(52) U.S. Cl.
CPC .......... *F16C 32/048* (2013.01); *F04D 29/058* (2013.01); *F16C 32/0448* (2013.01);
(Continued)

(58) Field of Classification Search
CPC ............... F16C 32/048; F16C 32/0451; F16C 32/0448; F16C 32/0489; F16C 32/0457;
(Continued)

(56) References Cited

U.S. PATENT DOCUMENTS

| 10,359,046 B2 * | 7/2019 | Kawashima | F04D 27/00 |
| 2013/0229079 A1 * | 9/2013 | Omori | H02K 7/09 |
| | | | 310/90.5 |
| 2014/0234139 A1 | 8/2014 | Sakawaki et al. | |

FOREIGN PATENT DOCUMENTS

JP   10-141373 A   5/1998

OTHER PUBLICATIONS

Extended European Search Report dated Jun. 24, 2019 in corresponding European Application No. 15910159.1.
(Continued)

*Primary Examiner* — Quyen P Leung
*Assistant Examiner* — Alexander A Singh
(74) *Attorney, Agent, or Firm* — Birch, Stewart, Kolasch & Birch, LLP

(57) ABSTRACT

A magnetic bearing supports an object to be supported in a noncontact manner by means of a composite electromagnetic force of first and second electromagnets. A processor-based controller causes a first current and a second current to be controlled according to the following equations, $$i_1 = \frac{g_0 - ax}{g_0}(i_b + i_d) \quad (1)$$

$$i_2 = \frac{g_0 + ax}{g_0}(i_b - i_d) \quad (2)$$

where $i_1$ is the first current flowing to the first electromagnet, $i_2$ is the second current flowing to the second electromagnet, $i_d$ is a control current, $i_b$ is a bias current, $g_0$ is a reference gap length, x is a displacement amount of the object to be supported with respect to a center position, and a is a predetermined correction coefficient.

11 Claims, 8 Drawing Sheets

(51) Int. Cl.
*F04D 29/058* (2006.01)
*F04D 25/06* (2006.01)
*H02K 7/14* (2006.01)

(52) U.S. Cl.
CPC ...... *F16C 32/0451* (2013.01); *F16C 32/0489* (2013.01); *H02K 7/09* (2013.01); *F04D 25/06* (2013.01); *F16C 32/0457* (2013.01); *F16C 2380/26* (2013.01); *H02K 7/14* (2013.01)

(58) Field of Classification Search
CPC ............. F16C 2380/26; F16C 32/0465; F16C 32/0482; F16C 32/0485; F16C 32/0487; F16C 32/0459; F16C 32/0461; F16C 32/0463; F16C 32/0468; F16C 32/047; F16C 32/0474; F16C 32/0476; F16C 32/0478; F16C 32/0491; F16C 32/0493; F16C 32/0495; F16C 32/0497; F16C 32/044; F04D 29/058; F04D 25/06; H02K 7/09; H02K 7/14
USPC .................................... 310/90, 90.5
See application file for complete search history.

(56) References Cited

OTHER PUBLICATIONS

International Search Report issued in PCT/JP2015/006174 (PCT/ISA/210), dated Mar. 8, 2016.

* cited by examiner

DYNAMIC STIFFNESS

PLANT TRANSFER FUNCTION

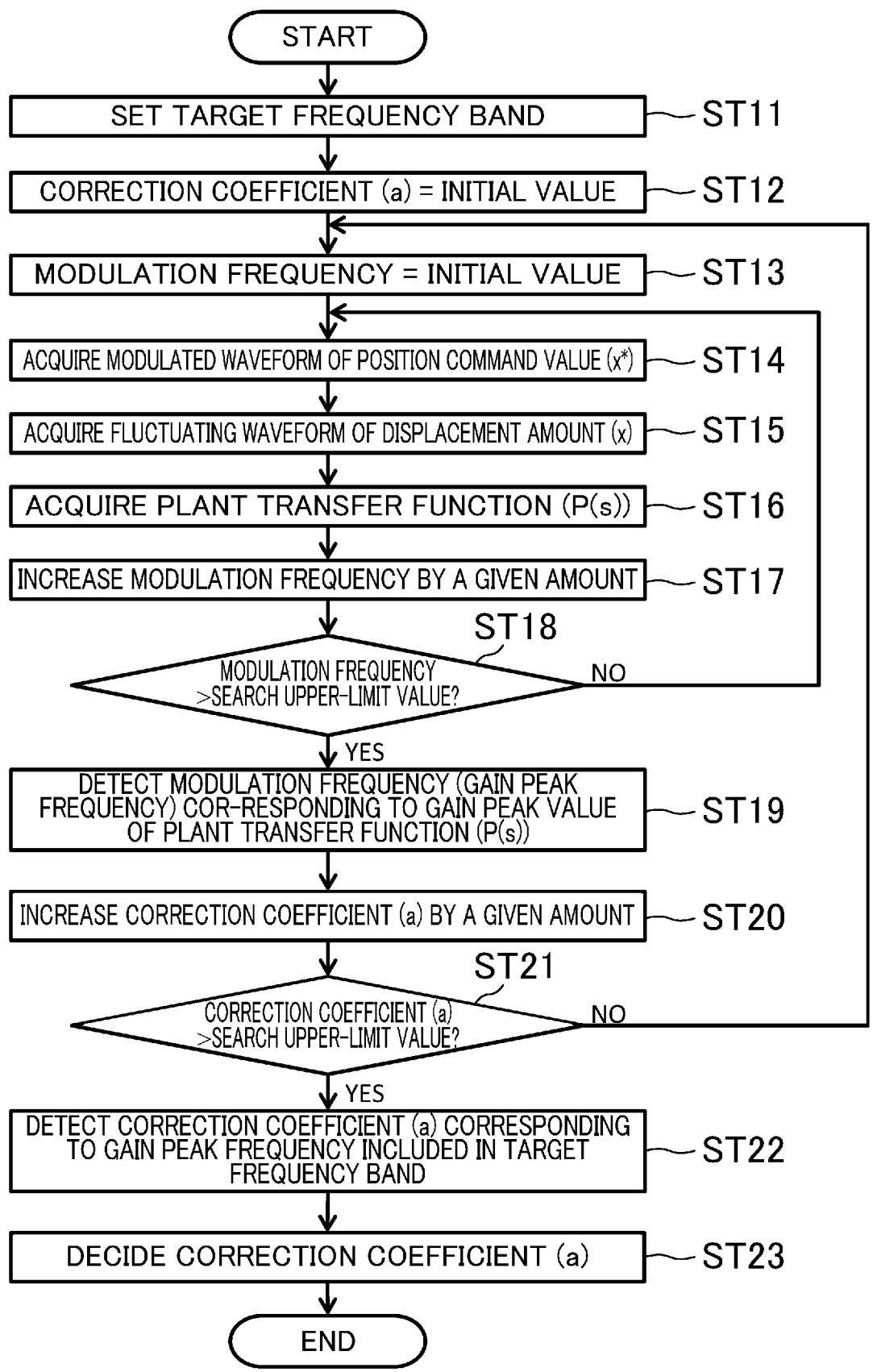

MAGNETIC BEARING DEVICE AND COMPRESSOR

CROSS-REFERENCE TO RELATED APPLICATIONS

This is a continuation of International Application No. PCT/JP2015/006174 filed on Dec. 10, 2015, the entire disclosure of which is incorporated by reference herein.

BACKGROUND

The present disclosure relates to a magnetic bearing and a compressor provided with the same.

A magnetic bearing has been conventionally known, which is capable of supporting an object to be supported (e.g., a rotary shaft) in a noncontact manner by means of a composite electromagnetic force of a plurality of electromagnets. For example, Japanese Unexamined Patent Publication No. H10-141373 depicts in FIG. 3 a magnetic bearing including first and second electromagnets opposed to each other with a rotor interposed therebetween and a current control section that controls the currents flowing to the first and second electromagnets. In this magnetic bearing, a push-pull current (control current) varying according to the load applied to the rotor (the object to be supported) and a fixed current (bias current) for operating the first and second electromagnets in a linear area are combined, to produce the currents flowing to coils of the first and second electromagnets.

SUMMARY

An objective of the present disclosure is providing a magnetic bearing device capable of preventing or reducing destabilization of levitation control caused by an unbalanced attraction force.

The magnetic bearing device according to the disclosure includes a magnetic bearing and a controller comprising a processor and a memory. The magnetic bearing has first and second electromagnets opposed to each other with an object to be supported interposed therebetween and supports the object to be supported in a noncontact manner by means of a composite electromagnetic force of the first and second electromagnets. The memory stores a program which, when executed by the processor, causes a first current and a second current to be controlled to according to the following equations:

$$i_1 = \frac{g_0 - ax}{g_0}(i_b + i_d) \quad (1)$$

$$i_2 = \frac{g_0 + ax}{g_0}(i_b - i_d) \quad (2)$$

where $i_1$ is the first current flowing to the first electromagnet, $i_2$ is the second current flowing to the second electromagnet, $i_d$ is a control current corresponding to a current component varying according to a displacement of the object to be supported in the opposed direction of the first and second electromagnets, $i_b$ is a bias current corresponding to a current component indicating a predetermined current value, $g_0$ is a reference gap length corresponding to a gap length between the object to be supported and the first and second electromagnets at the time when the object to be supported lies at a center position between the first and second electromagnets, x is a displacement amount of the object to be supported with respect to the center position in the opposed direction of the first and second electromagnets, and a is a predetermined correction coefficient.

According to the magnetic bearing device described above, the composite electromagnetic force of the first and second electromagnets can be expressed like equation 3 below.

$$F = k\left\{\frac{(g_0 - ax)(i_b + i_d)}{g_0(g_0 - x)}\right\}^2 - k\left\{\frac{(g_0 + ax)(i_b - i_d)}{g_0(g_0 + x)}\right\}^2 \quad (3)$$

Taylor-developing equation 3 above and performing first-order approximation, equation 4 below can be obtained.

$$F \cong k\frac{4i_b}{g_0^2}i_d - k\frac{4}{g_0^3}(i_b^2 + i_d^2)(a-1)x \quad (4)$$

From equation 4 above, a motion equation related to the levitation control of the object to be supported by the magnetic bearing device (a motion equation of a magnetic levitation control system) can be expressed like equation 5 below.

$$m\ddot{x} + k\frac{4}{g_0^3}(i_b^2 + i_d^2)(a-1)x = k\frac{4i_b}{g_0^2}i_d \quad (5)$$

As shown in equation 5 above, the coefficient of the displacement term related to the displacement amount (i.e., the coefficient of the term related to the force working on the object to be supported according to the displacement amount of the object to be supported) in the motion equation of the magnetic levitation control system (specifically, the motion equation where the acceleration term and the displacement term are on the left-hand side and the coefficient of the acceleration term is a positive value) depends on the correction coefficient. Because of this, by adjusting the correction coefficient, it is possible to adjust the coefficient of the displacement term related to the displacement amount in the motion equation of the magnetic levitation control system and, as a result, adjust the force working on the object to be supported according to the displacement amount of the object to be supported (specifically, an unbalanced attraction force).

BRIEF DESCRIPTION OF THE DRAWINGS

FIG. 9 is a flowchart for explaining correction coefficient setting operation.

DETAILED DESCRIPTION

An embodiment will be described hereinafter in detail with reference to the accompanying drawings. Note that identical or equivalent components are denoted by the same reference symbols, and description thereof will not be repeated.

Compressor

Figure 1:
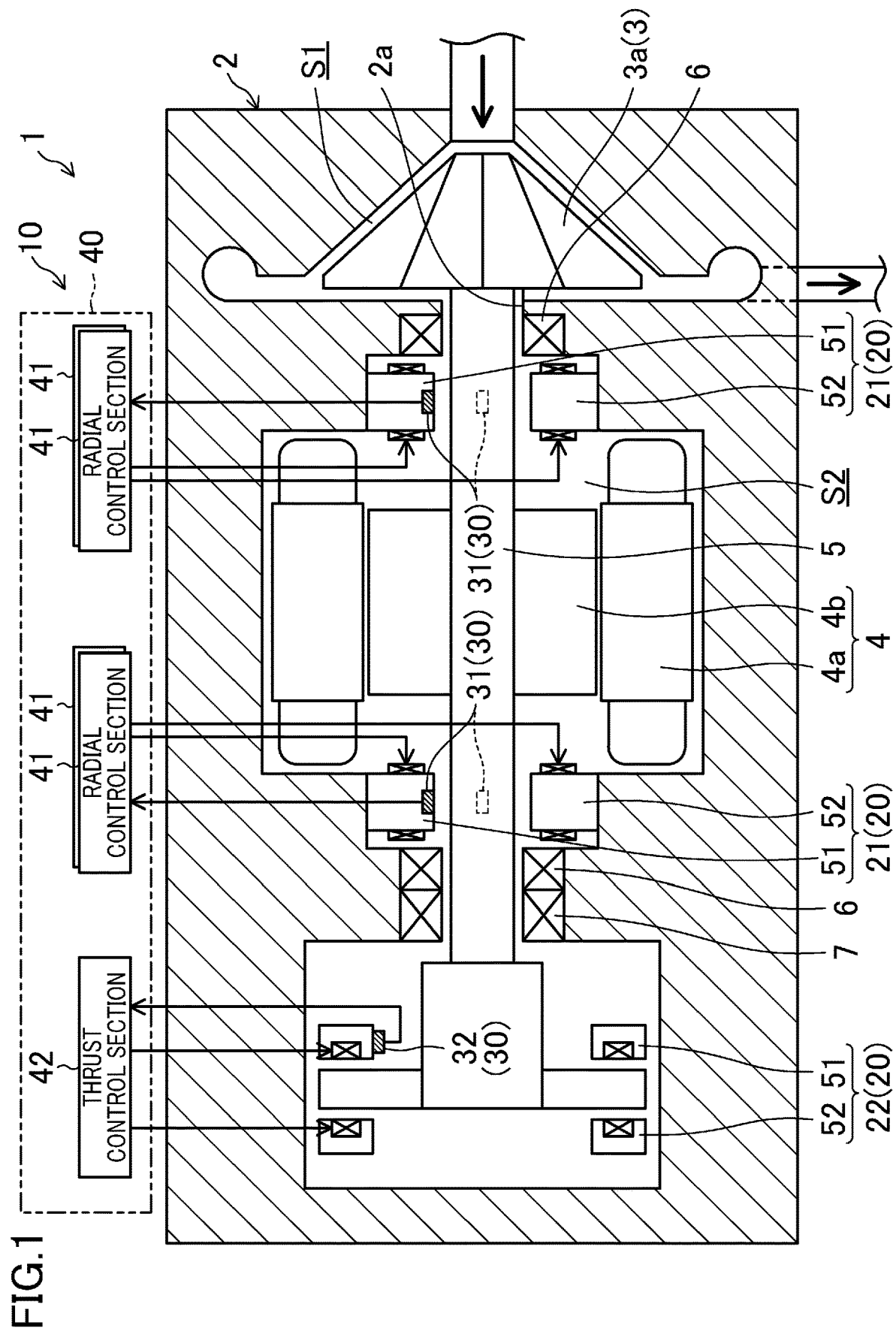
FIG. 1 is a longitudinal cross-sectional view showing a configuration example of a compressor according to an embodiment.

FIG. 1 shows a configuration example of a compressor 1 according to the embodiment. The compressor 1 includes a casing 2, a compression mechanism 3, an electric motor 4, a rotary shaft 5, radial touchdown bearings 6, a thrust touchdown bearing 7, and a magnetic bearing device 10.

Casing

The casing 2 is formed to have a shape of a cylinder with both ends closed and placed so that the axis line of the cylinder is horizontal. The space in the casing 2 is partitioned by a wall portion 2*a*: the space on the right side of the wall portion 2*a* constitutes a compression mechanism chamber S1 that accommodates the compression mechanism 3, and the space on the left side of the wall portion 2*a* constitutes an electric motor chamber S2 that accommodates the electric motor 4. The rotary shaft 5 extending axially inside the casing 2 couples the compression mechanism 3 and the electric motor 4.

Compression Mechanism

The compression mechanism 3 is configured to compress fluid. In the illustrated example, the compression mechanism 3 is constituted by an impeller 3*a*. The impeller 3*a* has a plurality of blades that are formed into a roughly conical outer shape, and is fixed to one end of the rotary shaft 5.

Electric Motor

The electric motor 4 is configured to rotate the rotary shaft 5. In this example, the electric motor 4 has a stator 4*a* and a rotor 4*b*. The stator 4*a*, formed to have a cylindrical shape, is fixed inside the casing 1. The rotor 4*b*, formed to have a columnar shape, is rotatably inserted along the inner circumference of the stator 4*a*. A shaft hole is formed in the center portion of the rotor 4*b*, through which the rotary shaft 5 is inserted and fixed.

Touchdown Bearing

The radial touchdown bearings 6 and the thrust touchdown bearing 7 are configured to support the rotary shaft 5 when the magnetic bearing device 10 is not energized (i.e., when the rotary shaft 5 is not levitating).

Magnetic Bearing Device

The magnetic bearing device 10 includes one or a plurality of (three in this example) magnetic bearings 20, one or a plurality of (five in this example) gap sensors 30, and a controller 40.

Magnetic Bearing

The magnetic bearing 20 has an electromagnet pair (e.g., first and second electromagnets 51, 52) opposed to each other with an object to be supported (in this example, a portion to be supported of the rotary shaft 5) interposed therebetween, and is configured to support the object to be supported in a noncontact manner by means of a composite electromagnetic force F of the electromagnet pair. In the magnetic bearing 20, by controlling a current pair flowing to the electromagnet pair (e.g., first and second currents i1, i2 flowing to the first and second electromagnets 51, 52), it is possible to control the composite electromagnetic force F of the electromagnet pair and thus control the position of the object to be supported in the opposed direction of the electromagnet pair.

In this example, two radial magnetic bearings 21 and one thrust magnetic bearing 22 constitute the three magnetic bearings 20. One of the two radial magnetic bearings 21 is hereinafter referred to as a "first radial magnetic bearing 21" and the other as a "second radial magnetic bearing 21."

Radial Magnetic Bearing

Figure 2:
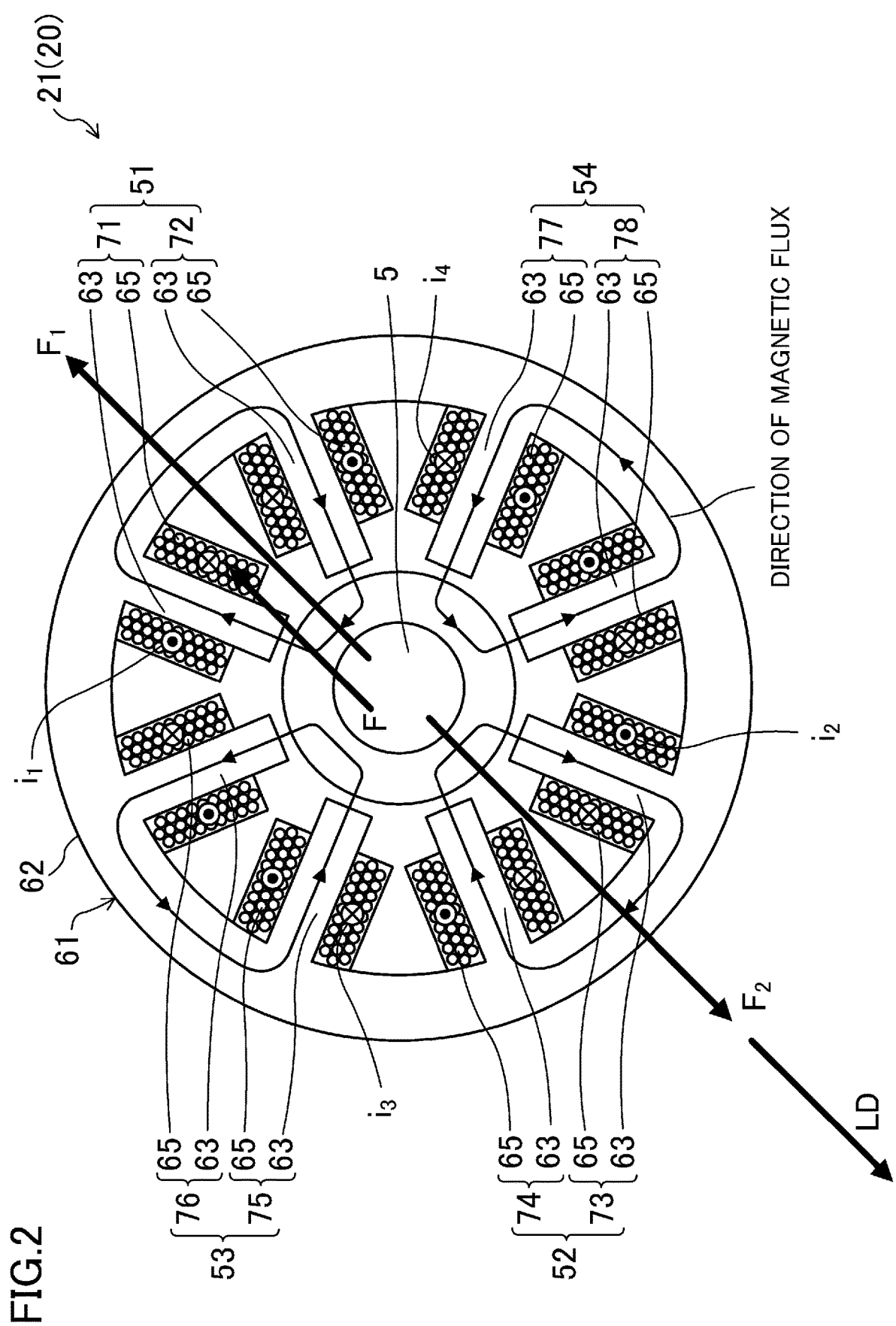
FIG. 2 is a transverse cross-sectional view showing a configuration example of a radial magnetic bearing.
Figure 3:
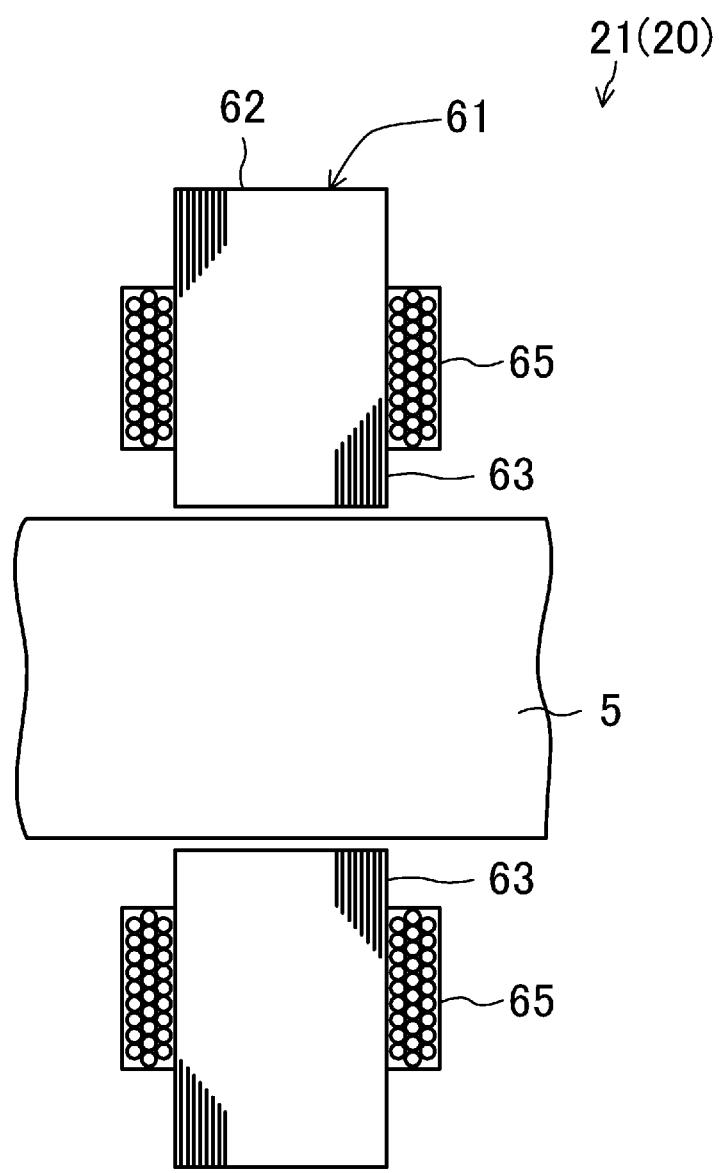
FIG. 3 is a longitudinal cross-sectional view showing the configuration example of the radial magnetic bearing.

As shown in FIGS. 2 and 3, the radial magnetic bearing 21 has first to fourth electromagnets 51 to 54, constituting a heteropolar type radial magnetic bearing. The first and second electromagnets 51, 52 are opposed to each other with the portion to be supported (shaft portion) of the rotary shaft 5 interposed therebetween, supporting the portion to be supported of the rotary shaft 5 in a noncontact manner by means of the composite electromagnetic force F of the first and second electromagnets 51, 52. The third and fourth electromagnets 53, 54 are opposed to each other with the portion to be supported (shaft portion) of the rotary shaft 5 interposed therebetween, supporting the portion to be supported of the rotary shaft 5 in a noncontact manner by means of the composite electromagnetic force F of the third and fourth electromagnets 53, 54. Note that the opposed direction of the third and fourth electromagnets 53, 54 (the direction diagonally right down as viewed in FIG. 2) is orthogonal to the opposed direction of the first and second electromagnets 51, 52 (the direction diagonally right up as viewed in FIG. 2) in a planar view.

Specifically, in this example, the radial magnetic bearing 21 includes a magnetic bearing core 61 and eight coils 65. The magnetic bearing core 61 is constituted by a plurality of electromagnetic steel sheets stacked on top of one another, for example, and has a back yoke 62 and eight teeth 63. The back yoke 62 is formed to have a cylindrical shape. The eight teeth 63 are arranged in the circumferential direction along the inner circumference of the back yoke 62 at given spacings (in this example, at spacings of 45°. Each of the teeth 63 protrudes from the inner circumference of the back yoke 62 in the radial direction with its inner circumference (tip face) being opposed to the outer circumference of the portion to be supported of the rotary shaft 5 with a given gap therebetween.

The eight coils 65 are wound around the eight teeth 63 of the magnetic bearing core 61, thereby forming eight electromagnet portions (first to eighth electromagnet portions 71 to 78) in this example. Specifically, the first electromagnet portion 71, the second electromagnet portion 72, the seventh electromagnet portion 77, the eighth electromagnet portion 78, the third electromagnet portion 73, the fourth electromagnet portion 74, the fifth electromagnet portion 75, and the sixth electromagnet portion 76 are arranged in this order in a clockwise direction as viewed in FIG. 2.

The first and second electromagnet portions 71, 72, the coils 65 of which are connected in series, constitute the first electromagnet 51. The third and fourth electromagnet portions 73, 74, the coils 65 of which are connected in series, constitute the second electromagnet 52. The first current i1 is fed to the coils of the first electromagnet 51 (i.e., the coils 65 of the first and second electromagnet portions 71, 72), and the second current i2 is fed to the coils of the second electromagnet 52 (i.e., the coils 65 of the third and fourth electromagnet portions 73, 74). By controlling the first and second currents i1, i2 flowing to the first and second electromagnets 51, 52, it is possible to control the composite electromagnetic force F of the first and second electromagnets 51, 52 and thus control the position of the portion to be supported (shaft portion) of the rotary shaft 5 in the opposed direction of the first and second electromagnets 51, 52 (i.e., the radial direction; the direction diagonally right up as viewed in FIG. 2).

The fifth and sixth electromagnet portions 75, 76, the coils 65 of which are connected in series, constitute the third electromagnet 53. The seventh and eighth electromagnet portions 77, 78, the coils 65 of which are connected in series, constitute the fourth electromagnet 54. A third current i3 is fed to the coils of the third electromagnet 53 (i.e., the coils 65 of the fifth and sixth electromagnet portions 75, 76), and a fourth current i4 is fed to the coils of the fourth electromagnet 54 (i.e., the coils 65 of the seventh and eighth electromagnet portions 77, 78). By controlling the third and fourth currents i3, i4 flowing to the third and fourth electromagnets 53, 54, it is possible to control the composite electromagnetic force F of the third and fourth electromagnets 53, 54 and thus control the position of the portion to be supported (shaft portion) of the rotary shaft 5 in the opposed direction of the third and fourth electromagnets 53, 54 (i.e., the radial direction orthogonal to the opposed direction of the first and second electromagnets 51, 52; the direction diagonally right down as viewed in FIG. 2).

Note that the winding direction of the coils 65 and the orientation of the currents flowing to the coils 65 are set so that an attraction force (i.e., an electromagnetic force acting in a direction in which the portion to be supported (shaft portion) of the rotary shaft 5 is attracted) occurs in each of the first to fourth electromagnets 51 to 54. Specifically, the winding direction of the coils 65 and the orientation of the currents flowing to the coils 65 are set so that magnetic fluxes occur in the directions shown by the arrows in FIG. 2.

Thrust Magnetic Bearing

Figure 4:
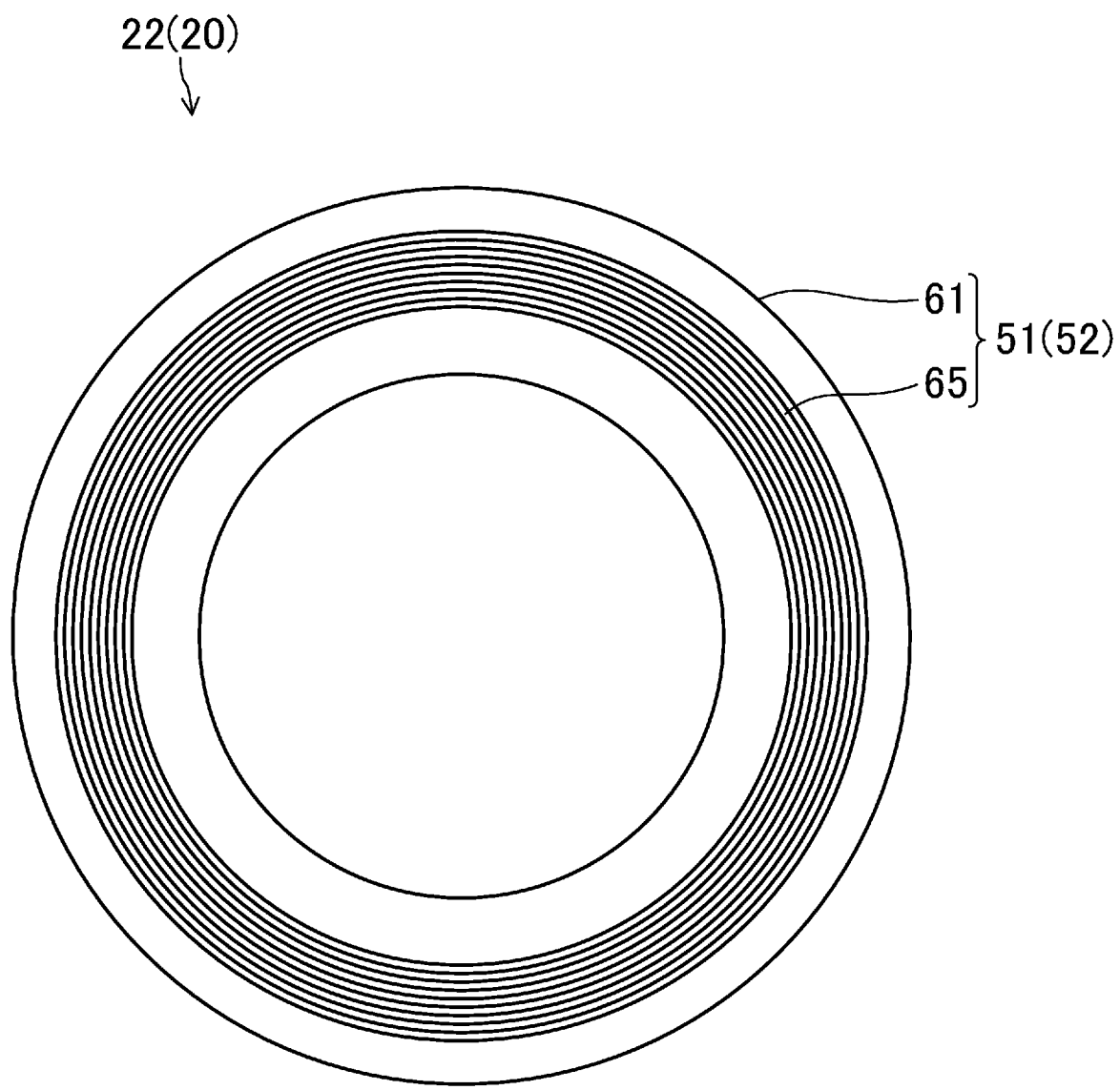
FIG. 4 is a plan view showing a configuration example of a thrust magnetic bearing.
Figure 5:
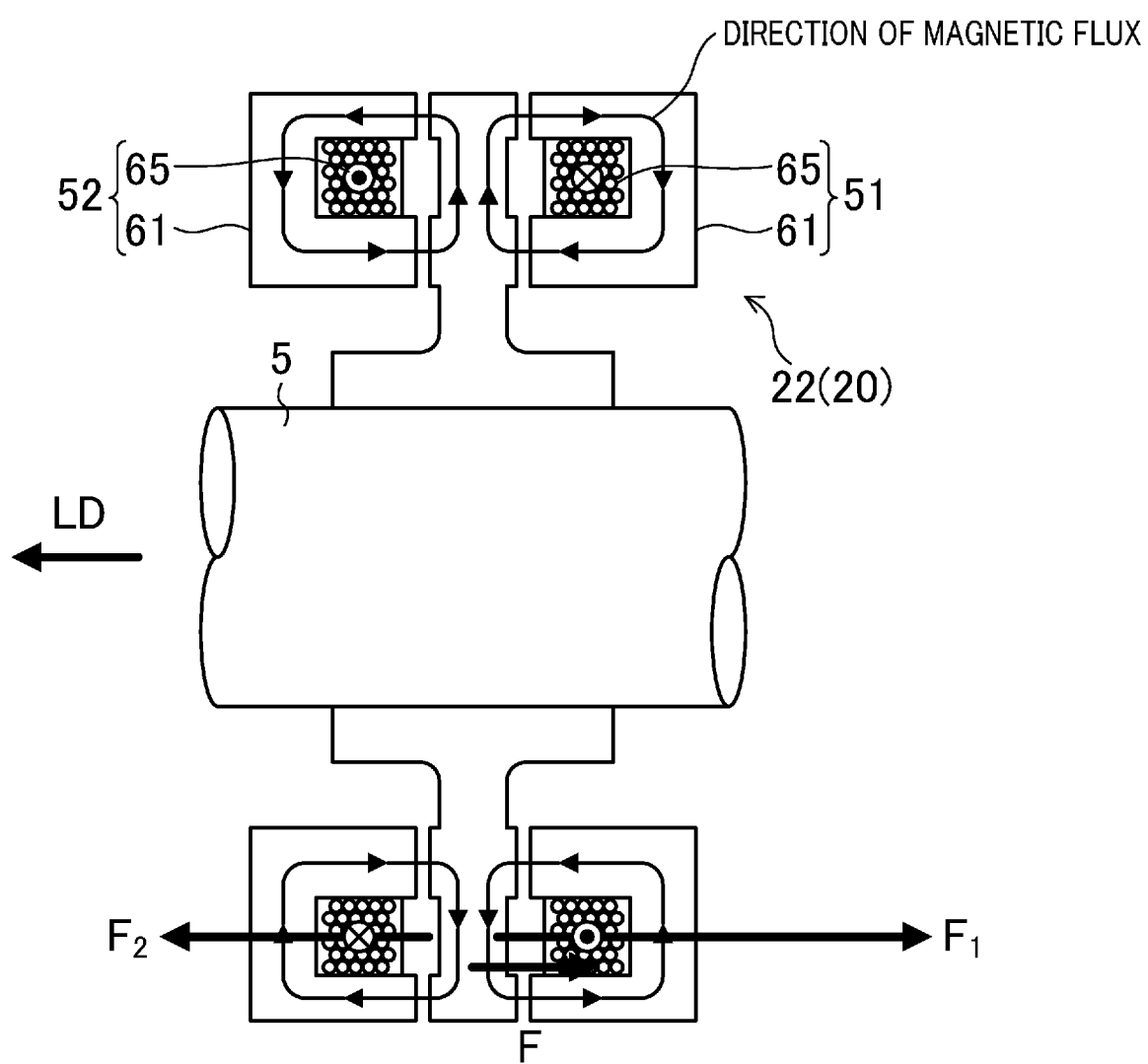
FIG. 5 is a longitudinal cross-sectional view showing the configuration example of the thrust magnetic bearing.

As shown in FIGS. 4 and 5, the thrust magnetic bearing 22 has first and second electromagnets 51, 52. Note that, in this example, the rotary shaft 5 has, at the other end thereof (the end opposite to the one end to which the impeller 3a is fixed), a disc shape protruding outward in the radial direction. The first and second electromagnets 51, 52 are opposed to each other with a portion to be supported (disc portion) of the rotary shaft 5 interposed therebetween, to support the portion to be supported of the rotary shaft 5 in a noncontact manner by means of the composite electromagnetic force F of the first and second electromagnets 51, 52.

Specifically, in this example, the thrust magnetic bearing 22 has two magnetic bearing cores 61 and two coils 65. The two magnetic bearing cores 61, each formed to have an annular shape, are placed on both sides of the portion to be supported (disc portion) of the rotary shaft 5 in the axial direction with a given gap from the portion to be supported. A circumferential groove is formed on the entire circumference of each of the opposed faces of the magnetic bearing cores 61. The two coils 65 are accommodated in the circumferential grooves of the two magnetic bearing cores 61. In this example, therefore, two electromagnets (the first electromagnet 51 and the second electromagnet 52) are provided. A first current i1 is fed to the coil 65 of the first electromagnet 51, and a second current i2 is fed to the coil 65 of the second electromagnet 52. By controlling the first and second currents i1, i2 flowing to the first and second electromagnets 51 and 52, it is possible to control the composite electromagnetic force F of the first and second electromagnets 51, 52 and thus control the position of the portion to be supported (disc portion) of the rotary shaft 5 in the opposed direction of the first and second electromagnets 51, 52 (i.e., the axial direction; the horizontal direction as viewed in FIG. 5).

Note that the winding direction of the coils 65 and the orientation of the currents flowing to the coils 65 are set so that an attraction force (i.e., an electromagnetic force acting in a direction in which the portion to be supported (disc portion) of the rotary shaft 5 is attracted) occurs in each of the first and second electromagnets 51, 52. Specifically, the winding direction of the coils 65 and the orientation of the currents flowing to the coils 65 are set so that magnetic fluxes occur in the directions shown by the arrows in FIG. 5.

Gap Sensor

As shown in FIG. 1, the gap sensors 30 correspond to the electromagnet pairs (e.g., the pair of the first and second electromagnets 51, 52) each opposed to each other with the object to be supported (in this example, the portion to be supported of the rotary shaft 5) interposed therebetween, and are configured to detect a displacement amount x of the object to be supported with respect to the center position in the opposed direction of the electromagnet pair (the reference position; e.g., the center position between the first and second electromagnets 51, 52). In this example, four radial gap sensors 31 and one thrust gap sensor 32 constitute the five gap sensors 30.

Radial Gap Sensor

The four radial gap sensors 31 are constituted by a radial gap sensor corresponding to the pair of the first and second electromagnets 51, 52 of the first radial magnetic bearing 21 (hereinafter referred to as a "first radial gap sensor 31"), a radial gap sensor corresponding to the pair of the third and fourth electromagnets 53, 54 of the first radial magnetic bearing 21 (hereinafter referred to as a "second radial gap sensor 31"), a radial gap sensor corresponding to the pair of the first and second electromagnets 51, 52 of the second radial magnetic bearing 21 (hereinafter referred to as a "third radial gap sensor 31"), and a radial gap sensor corresponding to the pair of the third and fourth electromagnets 53, 54 of the second radial magnetic bearing 21 (hereinafter referred to as a "fourth radial gap sensor 31").

Each of the first and third radial gap sensors 31 is configured to detect a displacement amount x of the portion to be supported of the rotary shaft 5 with respect to the center position in the opposed direction of the first and second electromagnets 51, 52 (i.e., the radial direction; the direction diagonally right up as viewed in FIG. 2). Note that, when the portion to be supported (shaft portion) of the rotary shaft 5 lies at the center position in the opposed direction of the first and second electromagnets 51, 52, the gap length between the first electromagnet 51 and the portion to be supported of the rotary shaft 5 is the same as the gap length between the second electromagnet 52 and the portion to be supported of the rotary shaft 5.

Each of the second and fourth radial gap sensors 31 is configured to detect a displacement amount x of the portion to be supported (shaft portion) of the rotary shaft 5 with respect to the center position in the opposed direction of the third and fourth electromagnets 53, 54 (i.e., the radial direction orthogonal to the opposed direction of the first and second electromagnets 51, 52; the direction diagonally right down as viewed in FIG. 2). Note that, when the portion to be supported (shaft portion) of the rotary shaft 5 lies at the center position in the opposed direction of the third and fourth electromagnets 53, 54, the gap length between the third electromagnet 53 and the portion to be supported of the rotary shaft 5 is the same as the gap length between the fourth electromagnet 54 and the portion to be supported of the rotary shaft 5.

Thrust Gap Sensor

The thrust gap sensor 32 corresponds to the pair of the first and second electromagnets 51, 52 of the thrust magnetic bearing 22, and is configured to detect a displacement amount x of the portion to be supported of the rotary shaft 5 with respect to the center position in the opposed direction of the first and second electromagnets 51, 52 (i.e., the axial direction; the horizontal direction as viewed in FIG. 2). Note that, when the portion to be supported (disc portion) of the rotary shaft 5 lies at the center position in the opposed direction of the first and second electromagnets 51, 52, the gap length between the first electromagnet 51 and the portion to be supported of the rotary shaft 5 is the same as the gap length between the second electromagnet 52 and the portion to be supported of the rotary shaft 5.

Controller

The controller 40 controls one or a plurality of magnetic bearings 20 so that the object to be supported (in this example, the portion to be supported of the rotary shaft 5) is supported in a noncontact manner. To describe in more detail, the controller 40 performs levitation control operation for each of electromagnet pairs (in this example, five electromagnet pairs) of one or a plurality of magnetic bearings 20. In the levitation control operation, based on the displacement amount x detected by a gap sensor 30 corresponding to an electromagnet pair, the controller 40 controls a current pair flowing to the electromagnet pair. Specifically, assuming that one electromagnet of the electromagnet pair is the "first electromagnet 51" and the other electromagnet is the "second electromagnet 52," the controller 40 controls the first and second currents i1, i2 flowing to the first and second electromagnets 51, 52 so that equations 1 and 2 below hold.

$$i_1 = \frac{g_0 - ax}{g_0}(i_b + i_d) \quad (1)$$

$$i_2 = \frac{g_0 + ax}{g_0}(i_b - i_d) \quad (2)$$

where "$i_1$" is the first current i1 flowing to the first electromagnet 51, "$i_2$" is the second current i2 flowing to the second electromagnet 52, "$i_d$" is a current component varying according to the displacement of an object to be supported (in this example, the portion to be supported of the rotary shaft 5) in the opposed direction of the first and second electromagnets 51, 52 (hereinafter referred to as a control current id), "$i_b$" is a current component indicating a predetermined current value (hereinafter referred to as a bias current ib), "$g_0$" is the gap length between the object to be supported and the first and second electromagnets 51, 52 at the time when the object to be supported lies at the center position (i.e., the reference position) between the first and second electromagnets 51, 52 (hereinafter referred to as a reference gap length g0), "x" is the displacement amount x of the object to be supported with respect to the center position in the opposed direction of the first and second electromagnets 51, 52, and "a" is a predetermined correction coefficient a.

Configuration of Controller

In this example, the controller 40 includes four radial control sections 41 and one thrust control section 42. The four radial control sections 41 are constituted by a radial control section corresponding to the pair of the first and second electromagnets 51, 52 of the first radial magnetic bearing 21 (hereinafter referred to as a first radial control section 41), a radial control section corresponding to the pair of the third and fourth electromagnets 53, 54 of the first radial magnetic bearing 21 (hereinafter referred to as a second radial control section 41), a radial control section corresponding to the pair of the first and second electromagnets 51, 52 of the second radial magnetic bearing 21 (hereinafter referred to as a third radial control section 43), and a radial control section corresponding to the pair of the third and fourth electromagnets 53, 54 of the second radial magnetic bearing 21 (hereinafter referred to as a fourth radial control section 41).

First Radial Control Section

The first radial control section 41 performs the levitation control operation for the first and second electromagnets 51, 52 of the first radial magnetic bearing 21 based on the displacement amount x detected by the first radial gap sensor 31. Specifically, the first radial control section 41 controls the first and second currents i1, i2 flowing to the first and second electromagnets 51, 52 of the first radial magnetic bearing 21 so that equations 1 and 2 above hold.

Second Radial Control Section

The second radial control section 41 performs the levitation control operation for the third and fourth electromagnets 53, 54 of the first radial magnetic bearing 21 based on the displacement amount x detected by the second radial gap sensor 31. Specifically, the second radial control section 41 controls the third and fourth currents i3, i4 flowing to the third and fourth electromagnets 53, 54 of the first radial magnetic bearing 21 so that two equations similar to equations 1 and 2 above (i.e., two equations obtained by substituting the third current i3, the fourth current i4, the third electromagnet 53, and the fourth electromagnet 54 for the first current i1, the second current i2, the first electromagnet 51, and the second electromagnet 52, respectively, in equations 1 and 2) hold.

Third Radial Control Section

The third radial control section 41 performs the levitation control operation for the first and second electromagnets 51, 52 of the second radial magnetic bearing 21 based on the displacement amount x detected by the third radial gap sensor 31. Specifically, like the first radial control section 41, the third radial control section 41 controls the first and second currents i1, i2 flowing to the first and second electromagnets 51, 52 of the second radial magnetic bearing 21 so that equations 1 and 2 above hold.

Fourth Radial Control Section

The fourth radial control section 41 performs the levitation control operation for the third and fourth electromagnets 53, 54 of the second radial magnetic bearing 21 based on the displacement amount x detected by the fourth radial gap sensor 31. Specifically, like the second radial control section 41, the fourth radial control section 41 controls the third and fourth currents i3, i4 flowing to the third and fourth electromagnets 53, 54 of the second radial magnetic bearing 21 so that the two equations similar to equations 1 and 2 above hold.

Thrust Control Section

The thrust control section 42 performs the levitation control operation for the first and second electromagnets 51, 52 of the thrust magnetic bearing 22 based on the displacement amount x detected by the thrust gap sensor 32. Specifically, the thrust control section 42 controls the first and second currents i1, i2 flowing to the first and second electromagnets 51, 52 of the thrust magnetic bearing 22 so that equations 1 and 2 above hold.

Details of Controller

Figure 6:
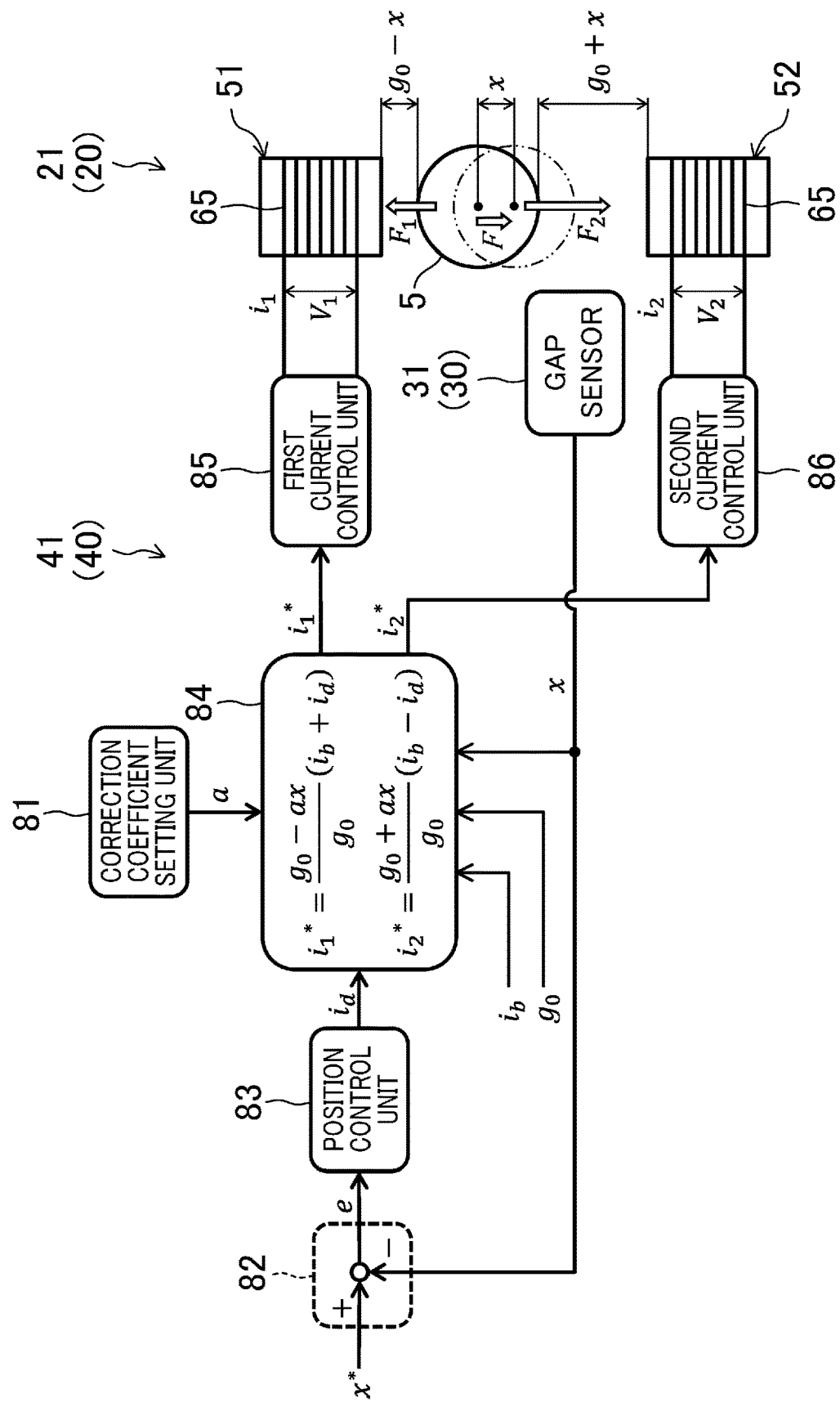
FIG. 6 is a block diagram showing a configuration example of a controller.

Next, referring to FIG. 6, the controller 40 will be described in detail. The controller 40 has one or a plurality of control sections (in this example, four radial control sections 41 and one thrust control section 42) respectively corresponding to electromagnet pairs (in this example, five electromagnet pairs) of one or a plurality of magnetic bearings 20, and each control section is configured as shown in FIG. 6. As an example, the configuration of the radial control section 41 will be described hereinafter.

In the levitation control operation, the radial control section 41 determines the control current id according to a position deviation value e corresponding to a differential value between the displacement amount x detected by the gap sensor 30 and a predetermined position command value x*, and, using the control current id, controls the first and second currents i1, i2 so that equations 1 and 2 above hold. Specifically, the radial control section 41 includes a correction coefficient setting unit 81, a position deviation computation unit 82, a position control unit 83, a current computation unit 84, a first current control unit 85, and a second current control unit 86.

Correction Coefficient Setting Unit

The correction coefficient setting unit 81 sets the correction coefficient a, which is a variable value. For example, the correction coefficient setting unit 81 is configured to change the correction coefficient a in response to control from outside. It is preferable to set the correction coefficient a at a value greater than 1. The correction coefficient a will be described later in detail.

Position Deviation Computation Unit and Position Control Unit

The position deviation computation unit 82 determines the position deviation value e corresponding to the differential value between the displacement amount x detected by the gap sensor 30 and the position command value x*. Specifically, the position deviation computation unit 82 determines the position deviation value e by subtracting the displacement amount x from the position command value x*. The position control unit 83 determines the control current id based on the position deviation value e determined by the position deviation computation unit 82. Specifically, the position control unit 83 decides the control current id so that the control current id is greater as the position deviation value e is greater.

Current Computation Unit

The current computation unit 84 determines a first current command value i1* and a second current command value i2* based on the correction coefficient a set by the correction coefficient setting unit 81, the control current id determined by the position control unit 83, the displacement amount x detected by the gap sensor 30, the predetermined bias current ib, and the predetermined reference gap length g0. Specifically, the current computation unit 84 determines the first current command value i1* and the second current command value i2* by substituting these parameter values (id, ib, x, g0, a) into the computing equations shown in FIG. 6.

Current Control Unit

The first current control unit 85 controls a first voltage V1 applied to the coils 65 of the first electromagnet 51 so that the first current i1 flowing to the coils 65 of the first electromagnet 51 becomes the first current command value i1* determined by the current computation unit 84. Specifically, the first current control unit 85 controls the first voltage V1 so that the first current i1 detected by a current detector (not shown) becomes the first current command value i1*.

The second current control unit 86 controls a second voltage V2 applied to the coils 65 of the second electromagnet 52 so that the second current i2 flowing to the coils 65 of the second electromagnet 52 becomes the second current command value i2* determined by the current computation unit 84. Specifically, the second current control unit 86 controls the second voltage V2 so that the second current i2 detected by the current detector (not shown) becomes the second current command value i2*.

Property of Levitation Control

Next, the property of the levitation control of the object to be supported by the magnetic bearing device 10 (i.e., the control for supporting the object to be supported in a noncontact manner) will be described.

Note that the definitions of the symbols in the following equations are as follows.

$i_1$: First current i1
$i_2$: Second current i2

$i_b$: Bias current ib
$i_d$: Control current id
$F_1$: Electromagnetic force F1 of first electromagnet 51
$F_2$: Electromagnetic force F2 of second electromagnet 52
F: Composite electromagnetic force F
m: Mass of the object to be supported
x: Displacement amount x of the object to be supported
x (two dots): Acceleration of the object to be supported (second order differential of displacement amount x)
k: Magnetic attraction coefficient (proportionality coefficient)
$g_0$: Reference gap length g0
P(s): Plant transfer function P(s)
X(s): Laplace transform value related to displacement amount x
Id(s): Laplace transform value related to control current id Note also that, in the following description, the center position (reference position) of the first and second electromagnets 51, 52 is assumed to be the origin of the displacement amount x of the object to be supported (i.e., the position where the displacement amount x is zero) and the direction from the second electromagnet 52 toward the first electromagnet 51 is assumed to be the positive direction.

Magnetic Levitation Control System

The motion equation related to the levitation control of the object to be supported (in this example, the portion to be supported of the rotary shaft 5) (i.e., the motion equation of a magnetic levitation control system) can be expressed like equation 11 below.

$$m\ddot{x}=F \quad (11)$$

Also, the composite electromagnetic force F of the first and second electromagnets 51, 52 can be expressed like equation 12 below using the electromagnetic force F1 of the first electromagnet 51 and the electromagnetic force F2 of the second electromagnet 52.

$$F=F_1-F_2 \quad (12)$$

The electromagnetic force F1 of the first electromagnet 51 tends to be directly proportional to the square of the first current i1 flowing to the first electromagnet 51 and inversely proportional to the square of the gap length g0-x between the first electromagnet 51 and the object to be supported. Likewise, the electromagnetic force F2 of the second electromagnet 52 tends to be directly proportional to the square of the second current i2 flowing to the second electromagnet 52 and inversely proportional to the square of the gap length g0+x between the second electromagnet 52 and the object to be supported. Therefore, using the first current i1, the second current i2, the reference gal length g0, and the displacement amount x, equation 12 can be rewritten like equation 13 below.

$$F = k\left(\frac{i_1}{g_0-x}\right)^2 - k\left(\frac{i_2}{g_0+x}\right)^2 \quad (13)$$

Comparative Example of Magnetic Bearing

A comparative example of the magnetic bearing device 10 will be described. In a general magnetic bearing device, in order to secure linearity between the composite electromagnetic force F of the first and second electromagnets 51, 52 and the control current id, the first and second currents i1, i2 are often generated based on the bias current ib and the control current id so that equations 14 and 15 below hold.

$$i_1=i_b+i_d \quad (14)$$

$$i_2=i_b-i_d \quad (15)$$

Substituting equations 14 and 15 into equation 13, equation 16 below can be obtained.

$$F = k\left(\frac{i_b+i_d}{g_0-x}\right)^2 - k\left(\frac{i_b-i_d}{g_0+x}\right)^2 \quad (16)$$

Taylor-developing equation 16 and performing first-order approximation, equation 17 below can be obtained.

$$F \cong k\frac{4i_b}{g_0^2}i_d + k\frac{4i_b^2}{g_0^3}x \quad (17)$$

Substituting equation 17 into equation 11 and arranging the result, a motion equation like equation 18 below can be obtained.

$$m\ddot{x} - k\frac{4i_b^2}{g_0^3}x = k\frac{4i_b}{g_0^2}i_d \quad (18)$$

Also, Laplace-transforming equation 18 and arranging the result, a plant transfer function P(s) like equation 19 below can be obtained. Note that the plant transfer function P(s) corresponds to a transfer function having the control current id as the input and the displacement amount x as the output.

$$P(s) = \frac{X(s)}{Id(s)} = \frac{k\frac{4i_b}{g_0^2}}{ms^2 - k\frac{4i_b^2}{g_0^3}} \quad (19)$$

In the motion equation shown as equation 18 (specifically, the motion equation where the acceleration term and the displacement term are on the left-hand side and the coefficient of the acceleration term is a positive value), the coefficient of the displacement term related to the displacement amount x (i.e., the coefficient of the term related to the force working on the object to be supported according to the displacement amount x of the object to be supported) is a negative value. This means that the levitation control of the object to be supported by the comparative example of the magnetic bearing device 10 (the magnetic bearing device in which equations 14 and 15 hold) has a negative spring property (i.e., the property that increases the displacement of the object to be supported from the center position). That is, in the comparative example of the magnetic bearing device 10, since an unbalanced attraction force acts on the object to be supported, increasing the displacement of the object to be supported from the center position, it is difficult to stabilize the levitation control of the object to be supported. Note that the coefficient of the displacement term related to the displacement amount x in the motion equation can be said to represent the correlation between the displacement amount x of the object to be supported and the force working on the object to be supported according to the displacement amount x of the object to be supported. That is, it can be said that, when the coefficient of the displacement term is a negative value, there is negative correlation (correlation in which, when one increases, the other decreases) between the displacement amount x of the object to be supported and the force working on the object to be supported according to the displacement amount x of the object to be supported, and, when the coefficient of the displacement term is a positive value, there is positive correlation (correlation in which, when one increases, the other also increases) between the displacement amount x of the object to be supported and the force working on the object to be supported according to the displacement amount x of the object to be supported.

Magnetic Bearing of Embodiment

On the contrary, in the magnetic bearing device 10 of this embodiment, the first and second currents i1, i2 are generated based on the bias current ib, the control current id, the reference gap length g0, the displacement amount x, and the correction coefficient a so that equations 20 and 21 below hold.

$$i_1 = \frac{g_0 - ax}{g_0}(i_b + i_d) \quad (20)$$

$$i_2 = \frac{g_0 + ax}{g_0}(i_b - i_d) \quad (21)$$

Substituting equations 20 and 21 into equation 13, equation 22 below can be obtained.

$$F = k\left\{\frac{(g_0 - ax)(i_b + i_d)}{g_0(g_0 - x)}\right\}^2 - k\left\{\frac{(g_0 + ax)(i_b - i_d)}{g_0(g_0 + x)}\right\}^2 \quad (22)$$

Taylor-developing equation 22 and performing first-order approximation, equation 23 below can be obtained.

$$F \cong k\frac{4i_b}{g_0^2}i_d - k\frac{4}{g_0^3}(i_b^2 + i_d^2)(a-1)x \quad (23)$$

Substituting equation 23 into equation 11 and arranging the result, a motion equation like equation 24 below can be obtained.

$$m\ddot{x} + k\frac{4}{g_0^3}(i_b^2 + i_d^2)(a-1)x = k\frac{4i_b}{g_0^2}i_d \quad (24)$$

Also, Laplace-transforming equation 24 and arranging the result, a plant transfer function P(s) like equation 25 below can be obtained.

$$P(s) = \frac{X(s)}{Id(s)} = \frac{k\frac{4i_b}{g_0^2}}{ms^2 + k\frac{4}{g_0^3}(i_b^2 + i_d^2)(a-1)} \quad (25)$$

In the motion equation shown as equation 24 (specifically, the motion equation where the acceleration term and the displacement term are on the left-hand side and the coefficient of the acceleration term is a positive value), the coefficient of the displacement term related to the displacement amount x (i.e., the coefficient of the term related to the force working on the object to be supported according to the displacement amount x of the object to be supported) depends on the correction coefficient a. Specifically, the coefficient of the displacement term is a negative value when the correction coefficient a is a value smaller than 1, zero when the correction coefficient a is 1, and a positive value when the correction coefficient a is a value greater than 1.

Note that, when the coefficient of the displacement term (the coefficient of the term related to the displacement amount x) in the motion equation of the magnetic levitation control system is a negative value (i.e., when the correction coefficient a is a value smaller than 1), an unbalanced attraction force is to act on the object to be supported. However, even if the correction coefficient a is a value smaller than 1, by approximating the correction coefficient a to 1, it is possible to reduce the absolute value of the coefficient of the displacement term in the motion equation of the magnetic levitation control system and, as a result, reduce the unbalanced attraction force acting on the object to be supported.

When the coefficient of the displacement term (the coefficient of the term related to the displacement amount x) in the motion equation of the magnetic levitation control system is zero (i.e., when the correction coefficient a is 1), the force working on the object to be supported according to the displacement amount x of the object to be supported (specifically, the unbalanced attraction force) is not to act apparently on the object to be supported.

When the coefficient of the displacement term (the coefficient of the term related to the displacement amount x) in the motion equation of the magnetic levitation control system is a value greater than 1 (i.e., when the correction coefficient a is a value greater than 1), once the object to be supported is displaced from the center position, a force acting in a direction impeding the displacement is to act on the object to be supported. In this case, the levitation control of the object to be supported by the magnetic bearing device 10 has a positive spring property (i.e., a property of impeding the displacement of the object to be supported from the center position).

Dynamic Stiffness

Figure 7:
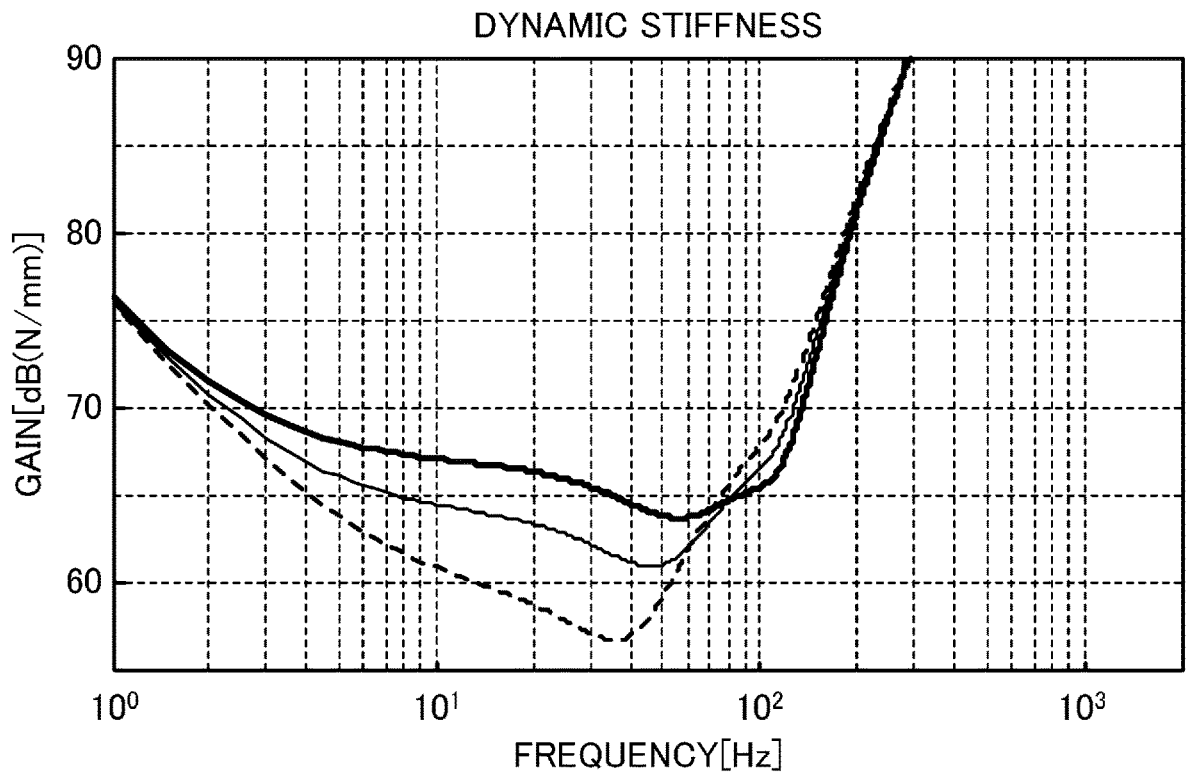
FIG. 7 is a graph for explaining dynamic stiffness of levitation control.

Next, referring to FIG. 7, the dynamic stiffness of the levitation control of the object to be supplied by the magnetic bearing device 10 will be described. The dynamic stiffness of levitation control refers to an index indicating the degree of difficulty in displacing the object to be supported from the center position in the levitation control. As the gain of the dynamic stiffness is higher, displacement of the object to be supported from the center position becomes harder. In FIG. 7, the broken line represents the frequency characteristics of the dynamic stiffness at the time when the correction coefficient a is a value smaller than 1, the fine solid line represents the frequency characteristics of the dynamic stiffness at the time when the correction coefficient a is 1, and the bold solid line represents the frequency characteristics of the dynamic stiffness at the time when the correction coefficient a is a value greater than 1.

As shown in FIG. 7, the gain of the dynamic stiffness of the levitation control increases as the correction coefficient a is closer to 1 from a value smaller than 1. This is because the absolute value of the coefficient of the displacement term (the coefficient of the term related to the displacement amount x) in the motion equation of the magnetic levitation control system gradually decreases and, as a result, the unbalanced attraction force gradually decreases. The gain of the dynamic stiffness of the levitation control further increases as the correction coefficient a is closer to a value greater than 1 from 1. This is because the coefficient of the displacement term (the coefficient of the term related to the displacement amount x) in the motion equation of the magnetic levitation control system becomes a positive value, the coefficient of the displacement term indicating the positive value gradually increases, and, as a result, once the object to be supported is displaced from the center position, the force working in a direction impeding this displacement gradually increases.

Plant Transfer Function

Figure 8:
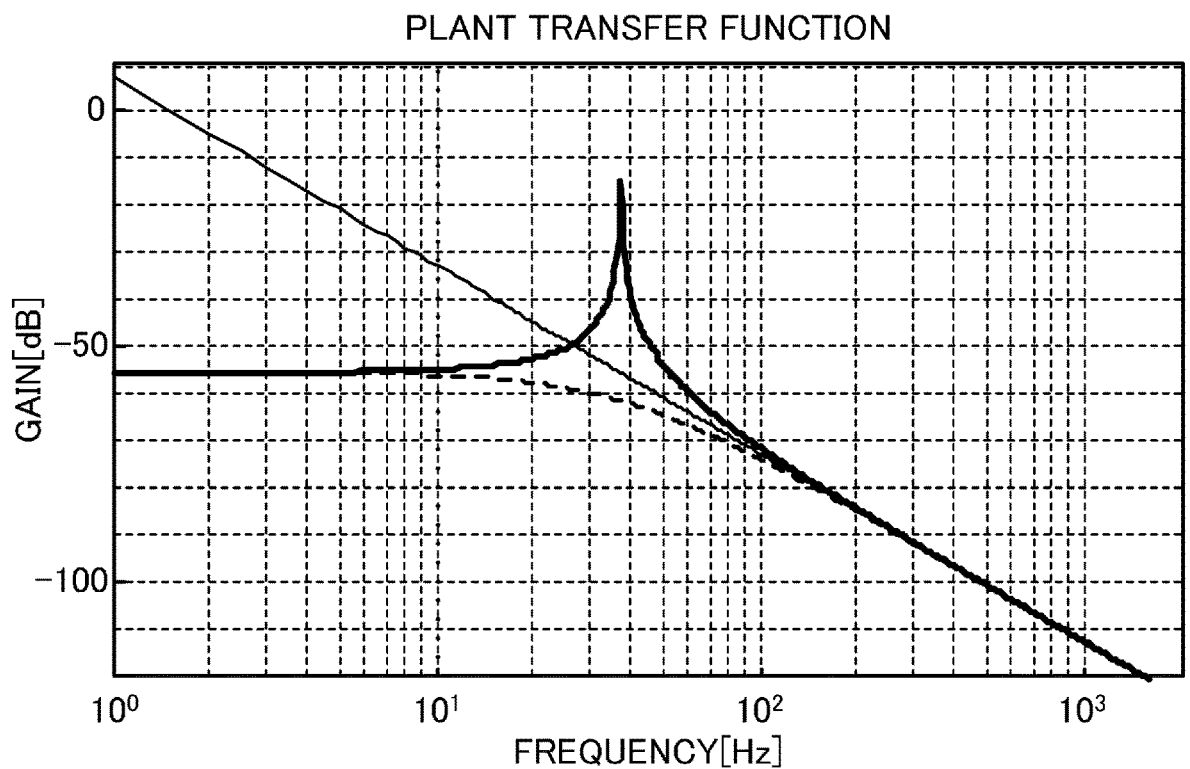
FIG. 8 is a graph for explaining a transfer function of levitation control.

Next, referring to FIG. 8, the plant transfer function of the levitation control of the object to be supported by the magnetic bearing device 10 will be described. In FIG. 8, the broken line represents the frequency characteristics of the plant transfer function at the time when the correction coefficient a is a value smaller than 1, the fine solid line represents the frequency characteristics of the plant transfer function at the time when the correction coefficient a is 1, and the bold solid line represents the frequency characteristics of the plant transfer function at the time when the correction coefficient a is a value greater than 1.

As shown in FIG. 8, when the correction coefficient a is a value smaller than 1 and when the correction coefficient a is 1, the plant transfer function P(s) does not exhibit a gain peak value (i.e., a Q value). By contrast, when the correction coefficient a is a value greater than 1, the plant transfer function P(s) exhibits a gain peak value (i.e., a Q value) in a given frequency band. This is because the coefficient of the displacement term (the coefficient of the term related to the displacement amount x) in the motion equation of the magnetic levitation control system becomes a positive value and, as a result, the levitation control of the object to be supported by the magnetic bearing device 10 has the positive spring property (i.e., the property of impeding the displacement of the object to be supported from the center position).

Effects of Embodiment

As described above, by adjusting the correction coefficient a, the coefficient of the displacement term related to the displacement amount x in the motion equation of the magnetic levitation control system can be adjusted. Thus, since the force working on the object to be supported according to the displacement amount x of the object to be supported (specifically, the unbalanced attraction force) can be adjusted, it is possible to prevent or reduce destabilization of the levitation control caused by the unbalanced attraction force.

Also, by setting the correction coefficient a at a value greater than 1, the coefficient of the displacement term related to the displacement amount x in the motion equation of the magnetic levitation control system can be a positive value. Thus, since the levitation control of the object to be supported by the magnetic bearing device 10 can be made to have the positive spring property (i.e., the property of impeding the displacement of the object to be supported from the center position), it is possible to prevent or reduce destabilization of the levitation control caused by the unbalanced attraction force.

Moreover, by making the correction coefficient a variable (i.e., by configuring the controller 40 so that the correction coefficient a can be changed), the coefficient of the displacement term related to the displacement amount x in the motion equation of the magnetic levitation control system can be adjusted arbitrarily. Thus, since the force working on the object to be supported according to the displacement amount x of the object to be supported can be adjusted arbitrarily, it is possible to appropriately prevent or reduce destabilization of the levitation control caused by the unbalanced attraction force. Note that the correction coefficient a may also be a fixed value.

As described above, since destabilization of the levitation control caused by the unbalanced attraction force can be prevented or reduced, the operating efficiency of the compressor 1 can be improved.

Modification of Controller

The controller 40 may also be configured to perform correction coefficient setting operation in addition to the levitation control operation. In the correction coefficient setting operation, the controller 40 sets a correction coefficient in the levitation control operation (i.e., the correction coefficient a used in the levitation control operation) so that the plant transfer function P(s) having the control current id as the input and the displacement amount x as the output exhibits a gain peak value (i.e., a Q value) in a predetermined target frequency band. In this example, the controller 40 performs five correction coefficient setting operations corresponding to five levitation control operations. Specifically, each of the four radial control sections 41 and one thrust control section 42 performs the levitation control operation and the correction coefficient setting operation.

Correction Coefficient Setting Operation

Referring to FIG. 9, the correction coefficient setting operation by the controller 40 will be described. Specifically, the correction coefficient setting unit 81 performs processing as follows.

Step ST11

First, the correction coefficient setting unit 81 sets a target frequency band. The target frequency band has been set at a given range of frequency band (e.g., 10 Hz to 100 Hz) including a predetermined target frequency (e.g., 50 Hz).

Step ST12

The correction coefficient setting unit 81 then sets the correction coefficient a at an initial value. Note that the initial value of the correction coefficient a has been set at a predetermined search lower-limit value (minimum value).

Step ST13

The correction coefficient setting unit 81 then sets the modulation frequency at an initial value. Note that the initial value of the modulation frequency has been set at a predetermined search lower-limit value (minimum value).

Step ST14

The correction coefficient setting unit 81 then acquires a modulated waveform of the position command value x* based on the current modulation frequency (i.e., the modulation frequency set in step ST12 or step ST17) and the predetermined position command value x*. Specifically, the correction coefficient setting unit 81 acquires a modulated waveform of the position command value x* by modulating the position command value x* using a sine wave having the same frequency as the modulation frequency (e.g., by superimposing the sine wave on the position command value x*).

Step ST15

The correction coefficient setting unit 81 then acquires a fluctuating waveform of the displacement amount x. Specifically, the correction coefficient setting unit 81 feeds the modulated waveform of the position command value x* acquired in step ST14, instead of the position command value x*, to the position deviation computation unit 82, and also feeds the current correction coefficient (i.e., the correction coefficient a set in step ST12 or step ST20) to the current computation unit 84. With this, the control of the first and second currents i1, i2 (i.e., the levitation control operation) is performed based on the modulated waveform of the position command value x* and the current correction coefficient a, and the correction coefficient setting unit 81 acquires a fluctuating waveform of the displacement amount x (i.e., a waveform exhibiting fluctuation of the displacement amount x) based on the displacement amount x detected by the gap sensor 30.

Step ST16

The correction coefficient setting unit 81 then acquires a plant transfer function P(s) having the control current id as the input and the displacement amount x as the output. The correction coefficient setting unit 81 then stores the gain value of the plant transfer function P(s) establishing a correspondence with the current modulation frequency. Specifically, the correction coefficient setting unit 81 performs the following processing.

First, the correction coefficient setting unit 81 Fourier-transforms the modulated waveform of the position command value x* acquired in step ST14 using the current modulation frequency, to acquire a Fourier transform value of the modulated waveform of the position command value x*. Also, the correction coefficient setting unit 81 Fourier-transforms the fluctuating waveform of the displacement amount x acquired in step ST15 using the current modulation frequency, to acquire a Fourier transform value of the fluctuating waveform of the displacement amount x.

Thereafter, the correction coefficient setting unit 81 divides the Fourier transform value of the fluctuating waveform of the displacement amount x by the Fourier transform value of the modulated waveform of the position command value x*, to acquire a closed-loop transfer function having the position command value x* as the input and the displacement amount x as the output, and transforms the closed-loop transfer function to an open-loop transfer function having the position deviation value e as the input and the displacement amount x as the output. The correction coefficient setting unit 81 then acquires the plant transfer function P(s) having the control current id as the input and the displacement amount x as the output by excluding the transfer function of the position control unit 83 from the open-loop transfer function. The correction coefficient setting unit 81 then stores the gain value of the plant transfer function P(s) and the current modulation frequency establishing a correspondence therebetween.

Step ST17, ST18

The correction coefficient setting unit 81 then increases the current modulation frequency by a predetermined amount (step ST17), and determines whether or not the current modulation frequency (i.e., the modulation frequency increased in step ST17) exceeds a predetermined search upper-limit value (maximum value) (step ST18). The process proceeds to step ST19 if the current modulation frequency exceeds the search upper-limit value, or otherwise proceeds to step ST14.

Thus, the processing in steps ST14 through ST17 is repeated until the current modulation frequency exceeds the search upper-limit value. As a result, a plurality of modulation frequencies and a plurality of gain values (gain values of the plant transfer function P(s)) are stored in the correction coefficient setting unit 81 in a one-to-one correspondence.

Step ST19

The correction coefficient setting unit 81 then detects the modulation frequency corresponding to the gain peak value (i.e., the Q value) of the plant transfer function P(s) (hereinafter referred to as the "gain peak frequency") among a plurality of modulation frequencies. The correction coefficient setting unit 81 then stores the gain peak frequency and the current correction coefficient a establishing a correspondence therebetween. Note that, when no modulation frequency corresponding to the gain peak value is included in the plurality of modulation frequencies (i.e., when the plant transfer function P(s) exhibits no Q value), the correction coefficient setting unit 81 does not store the current correction coefficient a.

Steps ST20, ST21

The correction coefficient setting unit 81 then increases the current correction coefficient a by a given amount (step ST20). The correction coefficient setting unit 81 then determines whether or not the current correction coefficient (i.e., the correction coefficient a increased in step ST20) exceeds a predetermined search upper-limit value (maximum value) (step ST21). The process proceeds to step ST22 if the current correction coefficient a exceeds the search upper-limit value, or otherwise proceeds to step ST13.

Thus, the processing in steps ST13 through ST20 is repeated until the current correction coefficient a exceeds the search upper-limit value. As a result, a plurality of correction coefficients a and a plurality of gain peak frequencies are stored in the correction coefficient setting unit 81 in a one-to-one correspondence.

Step ST22

The correction coefficient setting unit 81 then detects the correction coefficient a corresponding to the gain peak frequency included in the target frequency band set in step ST11 among a plurality of target coefficients a. Specifically, when only one gain peak frequency is included in the target frequency band, the correction coefficient setting unit 81 detects the correction coefficient a corresponding to this gain peak frequency, or when two or more gain peak frequencies are included in the target frequency band, it detects a correction coefficient a corresponding to one gain peak frequency closest to the target frequency included in the target frequency band among the two or more gain peak frequencies.

Step ST23

The correction coefficient setting unit 81 then decides the correction coefficient a in the levitation control operation (in this example, the computation in the current computation unit 84) based on the detection result of the correction coefficient a in step ST22. Specifically, the correction coefficient setting unit 81 decides the correction coefficient detected in step ST22 (i.e., the correction coefficient a corresponding to the gain peak frequency included in the target frequency band) as the correction coefficient a in the levitation control operation.

Effect by Modification of Controller

As described above, by performing the processing in steps ST11 through ST23, the correction coefficient a in the levitation control operation can be set so that the plant transfer function P(s) exhibits a gain peak value in the target frequency band. Note that, when the levitation control of the object to be supported by the magnetic bearing device 10 has the positive spring property (i.e., the property of impeding a displacement of the object to be supported from the center position), the plant transfer function P(s) tends to exhibit a gain peak value (i.e., a Q value) in a given frequency band (see FIG. 8). Therefore, by setting the correction coefficient a in the levitation control operation so that the plant transfer function P(s) exhibits a gain peak value in the target frequency band, the levitation control of the object to be supported by the magnetic bearing device 10 can be made to have the positive spring property. In this way, it is possible to prevent destabilization of levitation control caused by an unbalanced attraction force.

Other Embodiments

The displacement amount x and the correction coefficient a used in the above equations (specifically, equations 1 to 5 and 20 to 25) correspond to the true value of the displacement amount of the object to be supported with respect to the center position. Therefore, if the displacement amount of the object to be supported detected by the gap sensor 30 includes an error, the coefficient of the displacement term (the coefficient of the term related to the displacement amount x) in the motion equation of the magnetic levitation control system may be a positive value in some cases even when the correction coefficient a used in the current computation unit 84 of the controller 40 is a value smaller than 1 or 1.

The controller 40 can also be configured using an arithmetic circuit such as a CPU and a memory. The components of the controller 40 may be integrated into one arithmetic circuit or dispersed over a plurality of arithmetic circuits.

While the case that the radial magnetic bearing 21 constitutes a heteropolar type radial magnetic bearing has been described as an example, the radial magnetic bearing 21 may also constitute a homopolar type radial magnetic bearing.

It is to be understood that the above-described embodiment represents an essentially preferred form of the disclosure and should not be construed to restrict the ranges of the disclosure, applications thereof, or uses thereof.

As described above, the magnetic bearing device described above is useful as a device that supports an object to be supported such as a rotary shaft in a noncontact manner.

What is claimed is:
1. A magnetic bearing device, comprising:
a magnetic bearing that has first and second electromagnets opposed to each other with an object to be supported interposed therebetween and supports the object to be supported in a noncontact manner by means of a composite electromagnetic force of the first and second electromagnets; and
a processor coupled with a memory storing a program which, when executed by the processor, causes a first current and a second current to be controlled according to the following equations,

$$i_1 = \frac{g_0 - ax}{g_0}(i_b + i_d) \quad (1)$$

$$i_2 = \frac{g_0 + ax}{g_0}(i_b - i_d) \quad (2)$$

where $i_1$ is the first current flowing to the first electromagnet, $i_2$ is the second current flowing to the second electromagnet, $i_d$ is a control current corresponding to a current component varying according to a displacement of the object to be supported in the opposed direction of the first and second electromagnets, $i_b$ is a bias current corresponding to a current component indicating a predetermined current value, $g_0$ is a reference gap length corresponding to a gap length between the object to be supported and the first and second electromagnets at the time when the object to be supported lies at a center position between the first and second electromagnets, x is a displacement amount of the object to be supported with respect to the center position in the opposed direction of the first and second electromagnets, and a is a predetermined non-zero correction coefficient.

2. The magnetic bearing device of claim 1, wherein the predetermined non-zero correction coefficient is set at a value greater than 1.

3. The magnetic bearing device of claim 2, wherein the predetermined non-zero correction coefficient is a variable value.

4. The magnetic bearing device of claim 2, wherein the program, when executed by the processor, performs
a levitation control operation of determining the control current according to a position deviation value corresponding to a differential value between the displacement amount and a predetermined position command value and, using the control current, causing the first and second currents to satisfy the equations (1) and (2), and
a correction coefficient setting operation of setting; the predetermined non-zero correction coefficient in the levitation control operation so that a transfer function having the control current as an input and the displacement amount as an output exhibits a gain peak value in a predetermined target frequency band.

5. A compressor comprising:
the magnetic bearing device of claim 2;
a compression mechanism;
an electric motor; and
a rotary shaft that couples the compression mechanism and the electric motor, wherein
the magnetic bearing device is configured so that the first and second electromagnets of the magnetic bearing are opposed to each other with a portion to be supported of the rotary shaft interposed therebetween.

6. The magnetic bearing device of claim 1, wherein the predetermined non-zero correction coefficient is a variable value.

7. The magnetic bearing device of claim 6, wherein the program, when executed by the processor, performs
a levitation control operation of determining the control current according to a position deviation value corresponding to a differential value between the displacement amount and a predetermined position command value and, using the control current, causing the first and second currents to satisfy the equations (1) and (2), and
a correction coefficient setting operation of setting the predetermined non-zero correction coefficient in the levitation control operation so that a transfer function having the control current as an input and the displacement amount as an output exhibits a gain peak value in a predetermined target frequency band.

8. A compressor comprising:
the magnetic bearing device of claim 6;
a compression mechanism;
an electric motor; and
a rotary shaft that couples the compression mechanism and the electric motor,
wherein
the magnetic bearing device is configured so that the first and second electromagnets of the magnetic bearing are opposed to each other with a portion to be supported of the rotary shaft interposed therebetween.

9. The magnetic bearing device of claim 1, wherein the program, when executed by the processor, performs
a levitation control operation of determining the control current according to a position deviation value corresponding to a differential value between the displacement amount and a predetermined position command value and, using the control current, causing the first and second currents to satisfy the equations (1) and (2), and
a correction coefficient setting operation of setting the predetermined non-zero correction coefficient in the levitation control operation so that a transfer function having the control current as an input and the displacement amount as an output exhibits a gain peak value in a predetermined target frequency band.

10. A compressor comprising:
the magnetic bearing device of claim 9;
a compression mechanism;
an electric motor; and
a rotary shall that couples the compression mechanism and the electric motor,
wherein
the magnetic bearing device is configured so that the first and second electromagnets of the magnetic bearing are opposed to each other with a portion to be supported of the rotary shaft interposed therebetween.

11. A compressor comprising:
the magnetic bearing device of claim 1;
a compression mechanism;
an electric motor and
a rotary shaft that couples the compression mechanism and the electric motor,
wherein
the magnetic bearing device is configured so that the first and second electromagnets of the magnetic bearing are opposed to each other with a portion to be supported of the rotary shaft interposed therebetween.

* * * * *